Jan. 17, 1961   J. R. PERROZZI ET AL   2,968,210
ELECTRO-OPTICAL APPARATUS FOR MEASURING VOLUMES OF SOLIDS
Filed Aug. 8, 1957
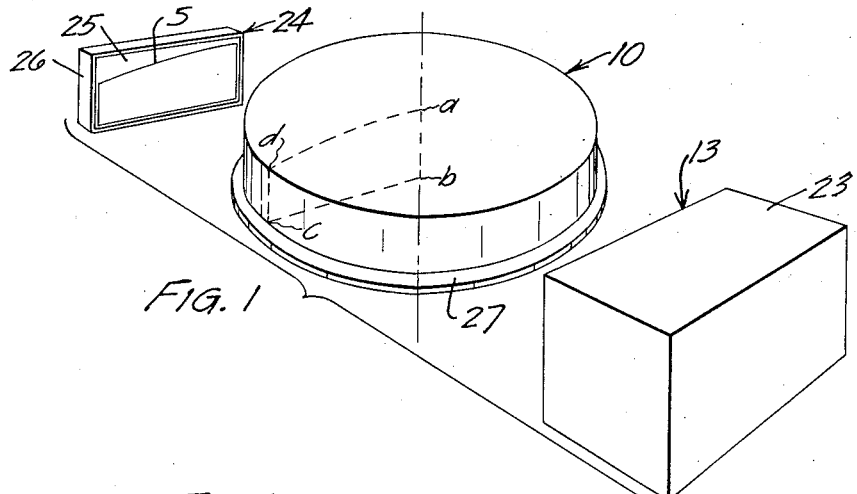
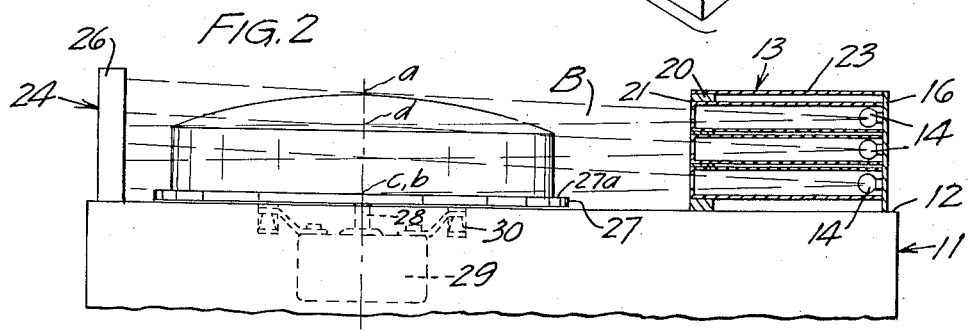
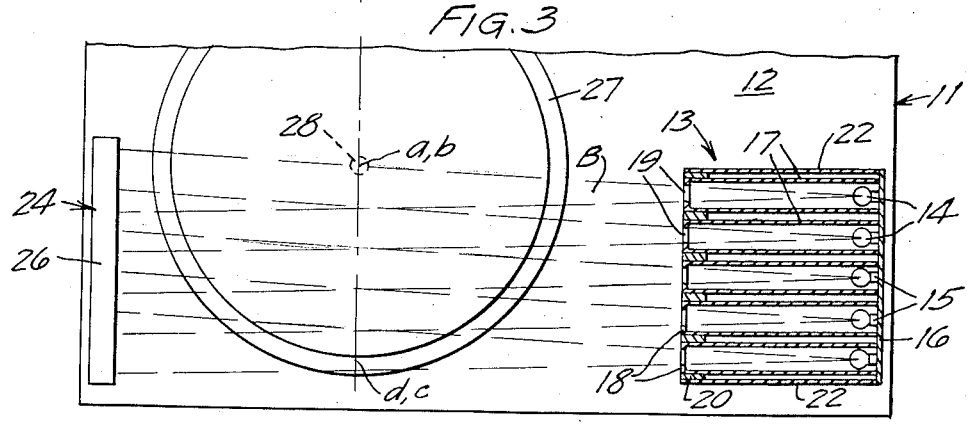
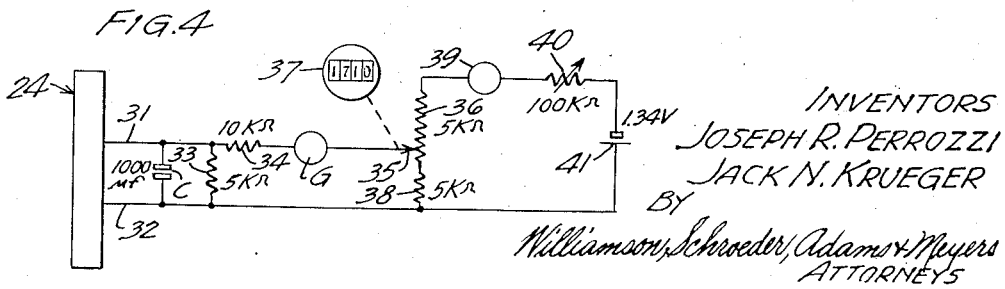
INVENTORS
JOSEPH R. PERROZZI
JACK N. KRUEGER
BY
Williamson, Schroeder, Adams & Meyers
ATTORNEYS United States Patent Office 2,968,210
Patented Jan. 17, 1961

2,968,210

ELECTRO-OPTICAL APPARATUS FOR MEASURING VOLUMES OF SOLIDS

Joseph R. Perrozzi, Minneapolis, and Jack N. Krueger, St. Paul, Minn., assignors to The Pillsbury Company, a corporation of Delaware Filed Aug. 8, 1957, Ser. No. 677,055

4 Claims. (Cl. 88—14)

This invention relates to volume measuring apparatus, and more particularly to apparatus for measuring the volume of geometric solids such as cakes and the like.

An object of our invention is the provision of new and improved apparatus of simple and inexpensive construction and operation for measuring the volume of geometric solids, such as cakes and the like.

Another object of our invention is to provide a novel apparatus for measuring the volume of a geometric solid by measuring the area of intersection between the solid and a plane passing through the solid, and then producing relative movement between the plane and the solid in a direction transverse to the plane to thereby measure a multiplicity of such areas, and then integrating the area measurements together to determine the solids volume.

A further object of our invention is the provision of improved apparatus for determining the volume of a geometric solid by rotating the solid, and by measuring and then integrating together a multiplicity of areas of intersection between the rotating solid and a stationary plane extending radially of the rotation axis.

A still further object of our invention is to provide a novel and improved apparatus for determining the volume of a geometric solid of the type having no depressions or concave deformities in the outer surface, by rotating the solid and directing light at the solid to produce a continuous area of uniform light intensity in a plane extending radially outwardly from the rotation axis, and measuring the shadow area produced and integrating the shadow area measurements to determine the solid's volume.

These and other objects and advantages of our invention will more fully appear from the following description made in connection with the accompanying drawings wherein like reference characters refer to the same or similar parts throughout the several views and in which:

Fig. 1 is a diagrammatic perspective view of the pertinent parts of the present invention;

Fig. 2 is a detail elevation view, partly in section, of the invention;

Fig. 3 is a detail top plan view, partly in section, of the invention; and Fig. 4 is a schematic view of the electrical circuit connected with the invention.

One form of the present invention is shown in the accompanying drawings and is described herein. In the embodiment of the invention shown the volume of a cake 10 may be determined. The cake 10 which is shown is generally circular in shape and has a rounded top.

The invention includes a supporting structure, which is indicated in general by numeral 11 and which may comprise a housing for certain portions of the apparatus to be disclosed. The supporting structure or housing 11 has a top deck 12.

Means are provided on the deck 12 for measuring the area of intersection between the cake 10 and a plane passing through the cake 10 and defined by the points $a$, $b$, $c$, and $d$. In the form shown the plane $abcd$ is oriented vertically and extends substantially radially of the circular cake. The plane is clearly shown in perspective by dot-dash lines in Fig. 1, and is shown as a dot-dash line in Figs. 2 and 3.

In the form shown, such means include a source of directional light indicated in general by numeral 13, on the upper deck 12 of the supporting structure and producing continuous light of uniform intensity in the plane $abcd$. In the form shown, the light source 13 includes a plurality of identical light bulbs 14 arranged in a bank of equally spaced vertical and horizontal rows. Each of the light bulbs 14 is carried in a conventional socket 15 which is affixed as by screws (not shown) to an upright plate 16. The light source also includes a plurality of elongated cylindrical and parallel collimating tubes 17 which are also arranged in equally spaced horizontal and vertical rows and which receive the lamps 14 in the rear ends thereof. The collimating tubes 17 have front end closures 18 which may be formed integrally therewith. Each of the front end closures 18 has a square aperture or opening 19 therein for permitting emanation of a square, slightly diverging beam of light B which is defined by dotted lines in Figs. 2 and 3. Of course the beams of light B are parallel with each other and are arranged in equally spaced horizontal and vertical rows. Each of the beams of light B intersects with the adjacent beams of light in the plane $abcd$ whereby to produce continuous light of uniform intensity at the plane.

The rear ends of the collimating tubes 17 are affixed by any suitable means such as screws (not shown), to the upright plate 16. A front mounting plate 20 has a plurality of circular apertures or openings 21 therein and arranged in equally spaced vertical and horizontal rows for carrying the front ends of the collimating tubes. The light source 13 has side and top walls 22 and 23 respectively which are secured to the mounting plate 20 and the rear plate 16 for holding the same in predetermined relation with each other and for defining an enclosure.

The area measuring means also includes an indication-producing and light-sensing device or apparatus which is indicated in general by the numeral 24. In the form shown, the apparatus 24 comprises a photoelectric cell 25 and a frame 26 encompassing the edge portion of the PE cell 25. It should be recognized that the PE cell 25 could comprise a bank of identical cells. The PE cell 25 is positioned in alignment with the light source 13, but in spaced relation therewith and with the continuous plane of uniform intensity light. It will be recognized that the light-sensitive surface of the PE cell 25 faces the light source 13. The PE cell is of conventional type which produces an indication in the form of an electric signal when light strikes the sensitive surface thereof and the indication produced is proportional to the quantity of light striking the surface.

Means are also provided for producing relative movement between the cake 10 and the plane $abcd$ in a direction transverse to the plane $abcd$ to facilitate the measurement of a multiplicity or myriad of areas of intersection between cake 10 and the plane $abcd$. In the form shown such means include a rotary support element or turntable 27 carried on the shaft 28 of a motor 29 which is carried by motor mounts 30 on the inside of the supporting structure or housing 11. The rotation axis of the turntable 27 is oriented vertically and extends along the vertical edge $ab$ of the continuous plane of light produced by the source 13. In the form shown, the motor 29 will revolve the turntable 27 at approximately 78 r.p.m. It will be noted in Fig. 2 that the upper surface 27$a$ of the turntable 27 extends in a horizontal plane which includes the bottom horizontal edge $bc$ of the continuous plane of light produced by the source 13.

Means are also provided for integrating the multiplicity or myriad of areas, or for integrating the continuous changing area indications produced by the light-sensing apparatus as the cake 10 and the plane *abcd* have relative movement in respect to each other. In the form shown such integrating means includes a capacitor C and the zero-center galvanometer G. The leads 31 and 32 from the PE cell have the capacitor C connected thereacross. A resistor 33 is also connected across the leads 31 and 32. Lead 31 is also connected through a resistor 34 to one side of the galvanometer G, and the other side of the galvanometer G is connected to the movable center tap 35 of a variable potentiometer 36. The potentiometer 36 may be of any conventional type having a scale indicator 37 connected thereto. One end of the potentiometer 36 is connected through a resistor 38 to the lead 32, and the other end of potentiometer 36 is connected to one side of an ammeter 39 of the type adapted for reading microamps. The other side of the ammeter 39 is connected through a variable resistor 40 to one side of a battery 41. The other side of the battery is connected to lead 32. Typical ohmic and capacitance values of the circuit elements are indicated on the drawing.

Operation

If the turntable 27 has no cake 10 or other geometric solid thereon, all of the light emanating from the source 13 will strike the PE cell 25. In this situation, the potentiometer 36 may be adjusted so that the indicator connected therewith will read "zero" and the variable resistor 40 will be adjusted so that the galvanometer G also reads "zero."

When the cake 10 is placed upon the turntable 27 and is rotated, a substantially smaller portion of the light emanating from the source 14 will strike the cell 25 and there will be a shadow area indicated by the letter S on the PE cell. The area S is directly related to the area of intersection between the cake and the plane *abcd*. As the turntable 27 and cake 10 are rotated, the area of intersection between the cake and the plane may continuously change and of course the shadow area S will also continuously change if the cake is at all irregular or if the cake 10 is not exactly concentric with the rotation axis of the turntable.

The variations in the shadow area S will produce variations of potential at the output of the PE cell or across the lines 31—32. The capacitor C will tend to damp the signal variations from the PE cell and will thereby integrate the indications produced by the PE cell. Of course the mechanical parts of the galvanometer will substantially follow variations in the signal applied thereto but small and rapid variations in the signal applied to the galvanometer may be damped, at least to some extent, by the mechanical movement of the galvanometer. In the particular circuit arrangement shown, the center tap of the potentiometer 36 is adjusted until the current through the galvanometer is zero. When the current in the galvanometer is zero, the scale 37 connected to the center tap 35 of the potentiometer will indicate the volume of the cake 10 or geometric solid on the turntable.

It should be noted that the placement of the cake on the turntable is not critical, and the cake may be eccentric of the rotation axis. As the eccentricity is increased, of course the variation in the magnitude of the signals produced by the PE cell is increased and the integrating apparatus or circuitry must do considerably more damping. However, the actual operation of the apparatus is still accurate to a high degree.

It will be seen that we have provided novel apparatus for accurately and quickly obtaining a measurement of the volume or size of cakes and other geometric solids which are so formed that there are no depressions or concave deformities in the surface of the cake, by directing a light at the cake and producing a shadow area proportional to the cross sectional area of the cake at one plane therethrough and by rotating the cake so as to produce shadows of other cross sectional areas and by measuring and integrating the shadow areas so as to produce an indication of the volume of the cake.

It will, of course, be understood that various changes may be made in the form, detail, arrangement and proportion of the parts without departing from the scope of our invention which consists of the matter described herein and set forth in the appended claims.

What is claimed is:

1. Apparatus for determining the relative value of volume of a geometric solid such as a cake, comprising a supporting structure, a rotary table on the supporting structure for supporting and rotating the geometric solid and having a rotation axis extending upwardly through the table, means rotating the table, a stationary source of directional light on the structure at one side of the table and a stationary photocell means on the structure at the other side of the table and in alignment with the source of directional light, said source of directional light including means producing a plurality of uniformly sized and narrow beams of light each diverging slightly from the source, the centers of the beams being substantially parallel and each beam intersecting with adjacent beams in a stationary plane of continuous and uniform intensity light lying normal to the beams and extending along said axis and radially outwardly therefrom and also extending upwardly from the table to permit positioning of the geometric solid such that the side and top surfaces thereof intersect the plane and cause a silhouette to be formed on the photocell means, circuit means connected with said photocell means and producing signals which vary with the quantity of light impinging upon said photocell means and said circuit means including means integrating said signals as the support table is revolved whereby to produce an indicium of the relative value of volume of the geometric solid.

2. The invention set forth in claim 1 wherein said source of light includes a bank of light bulbs and a plurality of collimating tubes cooperatively positioned with respect to the bulbs in light-directing relation thereto.

3. Apparatus for determining the relative value of volume of a geometric solid such as a cake, comprising a supporting structure, a rotary table on the supporting structure for supporting and rotating the geometric solid and having a rotation axis extending upwardly through the table, means rotating the table, a stationary source of directional light on the structure at one side of the table and a stationary photocell means on the structure at the other side of the table and in alignment with the source of directional light, said source of directional light producing a stationary finite plane of continuous and uniform intensity light with one edge of the plane lying along the rotation axis and said plane of light extending radially outwardly from said axis and upwardly from said table to permit positioning of the geometric solid such that the side and top surfaces thereof intersect the plane of light and cause a silhouette to be formed on the photocell means, circuit means connected with said photocell means and producing signals which vary with the quantity of light impinging upon the photocell means and said circuit means including means integrating said signals as the support table is revolved whereby to produce an indicium of the relative value of volume of the geometric solid.

4. Apparatus for determining the relative value of a volume of a geometric solid such as a cake, comprising a supporting structure, a rotary table on the supporting structure for carrying and rotating the geometric solid and having a rotation axis extending through the table to permit positioning of the geometric solid on the table with the rotation axis extending through the solid, means sensing the entire area of intersection between the geometric solid and a finite stationary plane extending along the rotation axis and radially outwardly therefrom and also extending upwardly from the table and said means producing an electrical signal indication related to said area, and circuit means receiving the multiplicity of successive electrical signal indications of area as the table is revolved and integrating said indications to produce an indicium of the relative value of volume of the geometric solid.

References Cited in the file of this patent

UNITED STATES PATENTS

| | | |
|---|---|---|
| 2,085,671 | Powers | June 29, 1937 |
| 2,139,474 | Shepard | Dec. 6, 1938 |
| 2,184,159 | Stockbarger et al. | Dec. 19, 1939 |
| 2,588,368 | Edgerton | Mar. 11, 1952 |
| 2,716,522 | Braid | Aug. 30, 1955 |

FOREIGN PATENTS

| | | |
|---|---|---|
| 854,587 | Germany | Nov. 6, 1952 |